United States Patent
Tinz et al.

[11] Patent Number: 5,143,120
[45] Date of Patent: Sep. 1, 1992

[54] ELECTROMAGNETIC VALVE ASSEMBLY

[75] Inventors: Reinhard Tinz, Bross-Biberau; Joachim Heinemann, Weinheim, both of Fed. Rep. of Germany

[73] Assignee: Firma Carl Freudenberg, Weinheim/Bergstr., Fed. Rep. of Germany

[21] Appl. No.: 668,871

[22] Filed: Mar. 13, 1991

[30] Foreign Application Priority Data

Mar. 15, 1990 [DE] Fed. Rep. of Germany ....... 4008266

[51] Int. Cl.⁵ .............................................. G05D 7/06
[52] U.S. Cl. .................................................. 137/601
[58] Field of Search ................................ 137/599, 601

[56] References Cited

U.S. PATENT DOCUMENTS

| | | | |
|---|---|---|---|
| 3,149,644 | 9/1964 | Bosack | 137/599 |
| 3,726,296 | 4/1973 | Friedland et al. | 137/599 X |
| 3,986,521 | 10/1976 | Wittmann-Liebold et al. | 137/599 |
| 4,170,245 | 10/1979 | Haley | 137/599 X |
| 4,248,263 | 2/1981 | Langill et al. | 137/599 X |
| 4,303,097 | 12/1981 | Zerby | 137/599 |
| 4,503,915 | 3/1985 | Gagliardo et al. | 137/599 X |
| 4,577,658 | 3/1986 | Bosteels et al. | 137/599 |
| 4,901,702 | 2/1990 | Beicht et al. | 123/520 |

FOREIGN PATENT DOCUMENTS 58-101067  6/1983  Japan .................................. 137/601

*Primary Examiner*—Stephen M. Hepperle
*Attorney, Agent, or Firm*—Felfe & Lynch

[57] ABSTRACT

An electromagnetic valve assembly has a main valve seat 32 and an auxiliary valve seat 35 disposed parallel to one another between an inlet opening 30 and an outlet opening 31. The auxiliary valve seat 35 has a smaller opening cross section than valve seat 32. Dimensions and mass of the auxiliary closing element 36 appertaining to the auxiliary valve seat 35 are correspondingly smaller than those of closing element 33 of valve seat 32. It can hence be brought into its open position much faster, which permits reducing the hydraulic stress exerted on the main closing element 33 and increasing the opening speed thereof.

3 Claims, 1 Drawing Sheet

ELECTROMAGNETIC VALVE ASSEMBLY

BACKGROUND OF THE INVENTION

The invention relates to an electromagnetic valve assembly where a valve seat is provided between an inlet and an outlet opening as well as a closing element which, by the force of a spring, tightly contacts the valve seat in a tension-free state.

A valve of this kind is known from U.S. Pat. No. 4,901,702. It is used for the supply of volatile fuel components from a fuel tank to the intake pipe of a combustion engine. The actuation is pulsed in order to ensure a careful adjustment of the volume of passing fuel vapors to the absorption capacity of the combustion engine.

SUMMARY OF THE INVENTION

The invention is based on the task of providing an electromagnetic valve of the aforesaid kind where the simplicity of actuation is similar to one of the known valve, yet has comparatively higher opening speed. While avoiding expensive electric circuits, the object is to obtain a more exact control of the volume of free-flowing agent which passes per unit time.

To accomplish this object, an auxiliary valve seat is provided in parallel with the valve seat between the inlet and the outlet. An auxiliary closing element is tightly pressed against the auxiliary valve seat by the force of an auxiliary spring, and the auxiliary valve seat has a smaller opening cross section than the main valve seat. The valve seat, the closing element and the spring hence form a main valve with an auxiliary valve operating parallel thereto. The relatively movable inertial masses of both the closing valve and the auxiliary closing valve are calculated to be as small as possible. The spring and the auxiliary spring are so soft as to just ensure a tight contact of the closing element and/or the auxiliary closing valve in a tension-free state of the corresponding magnet coils. A distinctive feature is in particular retained in that the inertial masses of all movable parts of the auxiliary valve are smaller than those of the main valve and in that the closing element of the auxiliary valve has a comparatively smaller static preload. When the magnetic coils of both the main valve and the auxiliary valve are actuated together, the auxiliary valve will assume the open position at an earlier point. This will reduce the hydraulic stress exerted on the main valve, and the opening speed of its closing element will be increased. The pulse frequency by means of which the valve of the invention is actuated is thus significantly above the one of the known embodiment. The amounts of free-flowing substance passing per time unit can thus be controlled with a substantially higher degree of accuracy.

A particular high response speed is obtained by selecting a ratio of the cross sections enclosed by valve seat and auxiliary valve seat of 1 to 100, preferably 5 to 50.

It proved to be particularly advantageous to use the electromagnetic valve of the invention for the pulsed supply of volatile fuel components from a fuel tank into the intake pipe of a combustion engine. The high pulse frequency by which the valve of the invention can be activated permits a particularly accurate adjustment of the volume of fuel vapors supplied to the intake pipe per time unit to the absorption capacity of the combustion engine in various operating conditions. In addition to avoiding operating failures of the combustion engine, it is also possible to obtain particularly good exhaust gas values in various states of operation.

DETAILED DESCRIPTION OF THE PREFERRED EMBODIMENT

Figure 1:
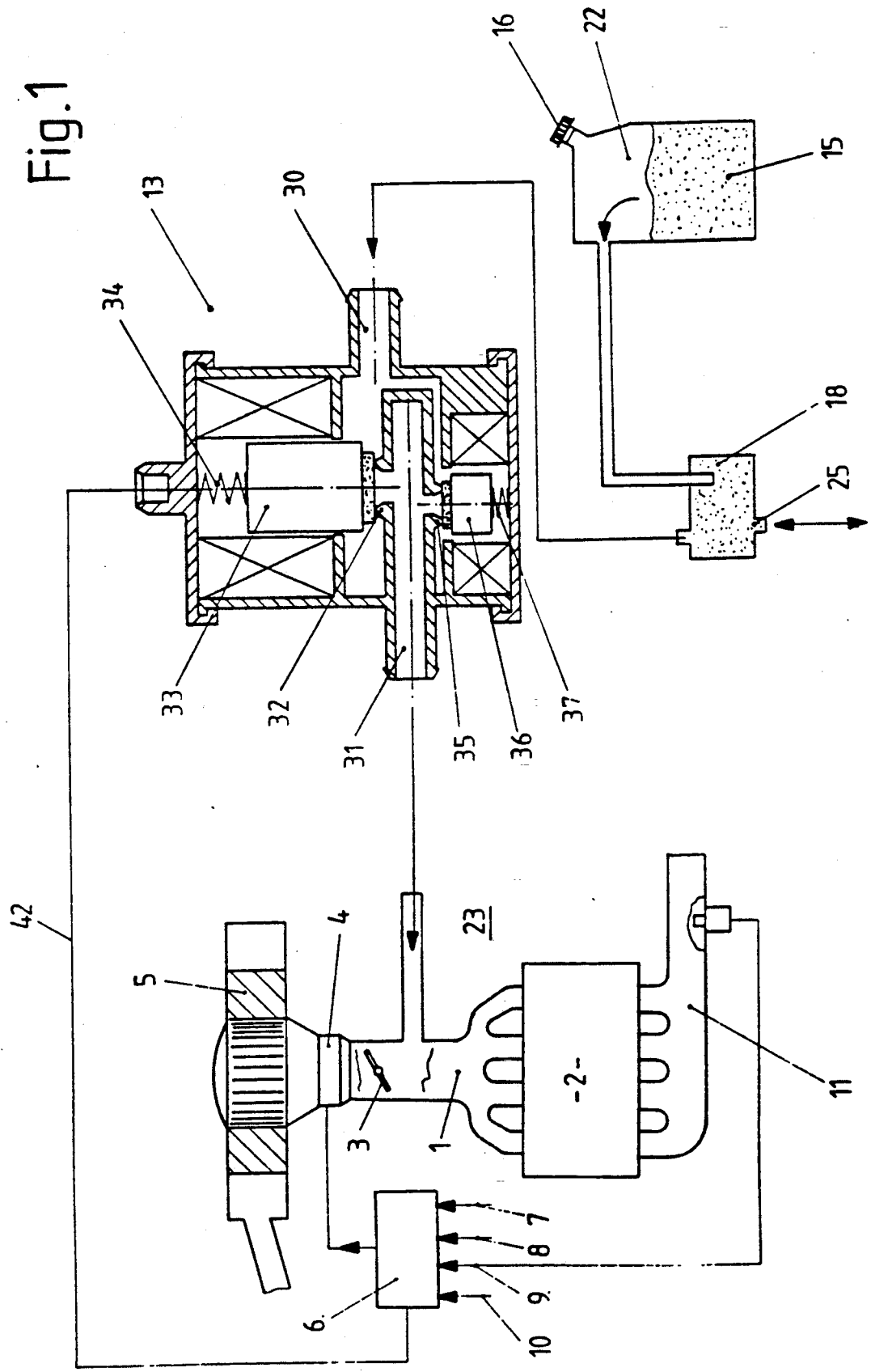
FIG. 1 is a diagrammatic representation of the fuel tank, activated carbon chamber, a first embodiment of the valve, and an internal combustion engine.

The combustion engine illustrated in the left portion of FIG. 1 is connected to an air filter 5 by means of an intake pipe 1 containing the throttle 3. An exhaust manifold 11 establishes the connection to the non-represented exhaust pipe.

A fuel supply device 4 is disposed in the intake pipe 1 above throttle 3. In this device, the necessary amount of fuel is added to the volume of fresh air supplied via air filter 5. The signals required for this purpose are provided by a control 6, for example, based on temperature and composition of the exhaust gas, engine speed and surrounding temperature. The corresponding input signals are sensed by means of corresponding sensors 7, 8, 9, 10. They can be supplemented as required.

The right portion of the drawing shows the corresponding fuel tank 15. It is not full and therefore has a free space above the fuel level. The closure 16 of the fuel tank hermetically closes it with respect to the environment.

A ventilating pipe 25 connects the free space 22 of the fuel tank to the atmosphere. This ventilating pipe 25 contains the storage chamber 18 which is filled with granules of activated carbon. The storage chamber 18 is dimensioned such that under normal operating conditions, no volatile fuel components can pass the orifice of the ventilating pipe 25.

On the side of storage chamber 18 which is opposite the orifice of the ventilating pipe 25, a line 20 is connected which establishes a contact between storage chamber 18 and intake pipe 1 of combustion engine 2. In this line 20, there is the electromagnetic valve 13 having an inlet 30 and an outlet 31. The valve 13 is closed when the combustion engine 2 is not in operation, and is activated by control 6. An electric line 42 connects the latter to the main magnetic coil 38 of the main valve 40, and the auxiliary magnetic coil 39 of the auxiliary valve 41.

The main valve essentially comprises main valve seat 32, main closing element 33, and main spring 34. The auxiliary valve 41 essentially comprises the auxiliary valve seat 35, auxiliary closing element 36 and the auxiliary spring 37.

The ratio of the area of the cross section of the valve seat 32 to the area of the cross section of the auxiliary valve seat 35 is about 40 to 1. Spring 34 and auxiliary spring 37 are compressed so softly that a tight contact between closing element 33 and valve seat 32, and between auxiliary closing element 36 and auxiliary valve seat 35, is just ensured. This and the comparatively smaller inertial mass of the auxiliary closing element 36 permit the auxiliary valve 41 to open earlier than the main valve 40 when both are actuated together. The fluid pressure on the main valve 40 is thus reduced, which increases its opening speed and permits enlarging the cross section of passage of its valve seat. The volume passing per time unit increases correspondingly.

When operating with pulsed actuation, the mass of volume passing per time unit can be changed as required by modifying the time interval during which main valve 40 and auxiliary valve 41 are opened per actuation and by changing the number of activations per time unit, i.e. the pulse frequency. The duration of individual activations is of particular importance to the embodiment of the invention. At very high frequencies, it includes the case that the signal prompting the electrical actuation in the connecting line 42 has already disappeared prior to the response of the main valve 40 so that only the auxiliary valve will be opened during a particularly short period of time. Correspondingly, the volume of passing fuel vapors is especially low. An operating situation of this kind is contrary to another extreme case wherein both the main valve 40 and auxiliary valve 41 remain in open positions over particularly long periods of time. In this case, the volume of fuel vapors passing per time unit is particularly high.

The permeability of the valve of the invention can be changed continuously between the two extremes without requiring a separate, electric control. In addition to particular good operating conditions of the combustion engine 2, the exhaust gas values will also be excellent.

We claim:

1. Electromagnetic valve assembly comprising
    an inlet,
    an outlet,
    a main valve between said inlet and said outlet, said main valve comprising a main valve seat defining an opening having a cross sectional area, a main closing element lying between said inlet and said main valve seat, a main spring which urges said closing element against said seat, and main magnetic means comprising a magnetic coil effective to open said valve,
    an auxiliary valve in parallel with said main valve between said inlet and said outlet, said auxiliary valve comprising an auxiliary valve seat defining an opening having a smaller cross sectional area than the cross-sectional area in the opening defining the main valve seat, an auxiliary closing element lying between said inlet and said auxiliary valve seat and having a smaller inertial mass than the main closing element, an auxiliary spring which urges said auxiliary closing element against said auxiliary valve seat, and auxiliary magnetic means comprising a magnetic coil effective to open said auxiliary valve, and
    control means for simultaneously activating said magnetic coils in pulses having a variable duration and frequency, whereby, upon subjecting said main valve element and said auxiliary valve element to fluid pressure and activating the respective magnetic coils, the auxiliary valve element will open first and thus reduce the fluid pressure on the main valve element, the duration and frequency of the pulses determining the supply of fluid from said inlet to said outlet.

2. Valve assembly in accordance with claim 1 wherein the ratio of the cross sectional area of the opening defined by the main valve seat to the cross sectional area of the opening defined by the auxiliary valve seat is between 2 to 1 and 100 to 1.

3. Valve assembly as in claim 2 wherein said ratio is between 5 to 1 and 50 to 1.

* * * * *